(12) United States Patent
An et al.

(10) Patent No.: US 11,159,722 B2
(45) Date of Patent: Oct. 26, 2021

(54) METHOD FOR PROCESSING IMAGE SIGNAL, IMAGE SIGNAL PROCESSOR, AND IMAGE SENSOR CHIP

(71) Applicant: SK hynix Inc., Icheon-si (KR)

(72) Inventors: Jae Ho An, Yongin-si (KR); Su Min Kim, Namyangju-si (KR); Jin Su Kim, Icheon-si (KR); Tae Hyun Kim, Seongnam-si (KR); Jae Yoon Yoo, Seongnam-si (KR); Chang Hee Pyeoun, Seoul (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/671,554

(22) Filed: Nov. 1, 2019

(65) Prior Publication Data
US 2020/0228709 A1  Jul. 16, 2020

(30) Foreign Application Priority Data

Jan. 10, 2019  (KR) .......................... 10-2019-0003337

(51) Int. Cl.
*H04N 5/232* (2006.01)
*H04N 9/04* (2006.01)

(52) U.S. Cl.
CPC ..... *H04N 5/23258* (2013.01); *H04N 5/23267* (2013.01); *H04N 9/04515* (2018.08); *H04N 9/04557* (2018.08)

(58) Field of Classification Search
CPC .......... H04N 5/23258; H04N 9/04557; H04N 9/04515; H04N 5/23267
See application file for complete search history.

(56) References Cited

U.S. PATENT DOCUMENTS

| | | | |
|---|---|---|---|
| 2001/0055067 A1* | 12/2001 | Wada ..................... | H04N 5/217 348/241 |
| 2011/0141318 A1* | 6/2011 | Lee ........................ | H04N 5/369 348/240.2 |
| 2011/0292236 A1* | 12/2011 | Shiohara ............ | H04N 5/23293 348/222.1 |
| 2012/0155761 A1 | 6/2012 | Matsuoka | |
| 2012/0199724 A1* | 8/2012 | Nomura ................. | H04N 5/378 250/208.1 |
| 2014/0184837 A1* | 7/2014 | Shibata .............. | H04N 5/23267 348/208.6 |

(Continued)

FOREIGN PATENT DOCUMENTS

| CN | 1835599 A | 9/2006 |
|---|---|---|
| CN | 101534385 A | 9/2009 |

(Continued)

*Primary Examiner* — Jason A Flohre
(74) *Attorney, Agent, or Firm* — Perkins Coie LLP

(57) ABSTRACT

A method for processing an image signal, an image signal processor, and an image sensor chip are disclosed. A method for processing an image signal includes generating Bayer order status information indicating whether a Bayer order of a Bayer pattern image has been changed, based on translation information of gyro information, performing translation correction about the Bayer pattern image using the translation information, and performing interpolation about the Bayer pattern image in which the translation correction has been performed, based on the Bayer order status information.

17 Claims, 9 Drawing Sheets

(56) References Cited

U.S. PATENT DOCUMENTS

| | | | | |
|---|---|---|---|---|
| 2014/0218569 A1* | 8/2014 | Tsubaki | ............. | H04N 5/23274 |
| | | | | 348/241 |
| 2014/0362241 A1* | 12/2014 | Shimada | ................ | H04N 5/361 |
| | | | | 348/208.4 |
| 2015/0123990 A1* | 5/2015 | Satoh | ................. | H04N 5/23248 |
| | | | | 345/625 |
| 2017/0195574 A1* | 7/2017 | Wong | ..................... | H04N 5/369 |
| 2019/0289171 A1* | 9/2019 | Kenjo | .................. | H04N 5/3532 |
| 2020/0204746 A1* | 6/2020 | Kang | ............... | H04N 5/232935 |

FOREIGN PATENT DOCUMENTS

| | | | |
|---|---|---|---|
| CN | 102110699 | A | 6/2011 |
| CN | 102907103 | A | 1/2013 |
| CN | 104079904 | A | 10/2014 |
| CN | 105191283 | A | 12/2015 |
| CN | 106817534 | A | 6/2017 |
| KR | 10-2010-0083197 | | 7/2010 |
| KR | 10-2015-0135771 | | 12/2015 |

\* cited by examiner

GB_first -> GB_first

GB_first -> BG_first

GB_first -> RG_first

GB_first -> GR_first shaking image
stabilized image

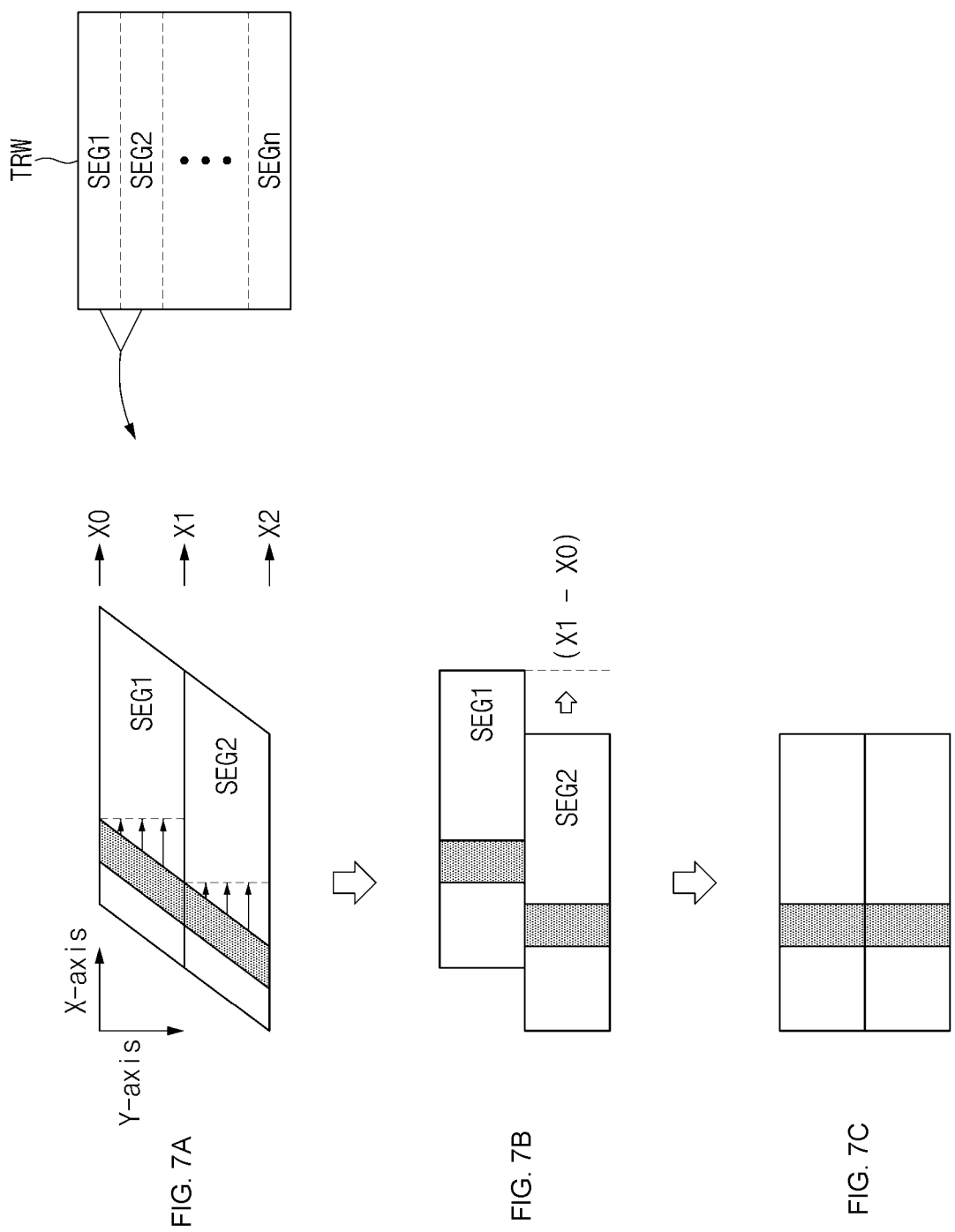

METHOD FOR PROCESSING IMAGE SIGNAL, IMAGE SIGNAL PROCESSOR, AND IMAGE SENSOR CHIP

CROSS-REFERENCE TO RELATED APPLICATION

This patent document claims priority based upon Korean patent application No. 10-2019-0003337, filed on Jan. 10, 2019, the disclosure of which is hereby incorporated in its entirety by reference herein.

TECHNICAL FIELD

The technology and implementations disclosed in this patent document relate to a method for processing image signal, image signal processor and an image sensor chip to perform a shaking correction.

BACKGROUND

An image sensor is a device for capturing at least one image using semiconductor characteristics that react to light. In recent times, with the increasing development of computer industries and communication industries, demand for high-quality and high-performance image sensors is rapidly increasing in various fields, for example, smartphones, digital cameras, game consoles, Internet of Things (IoT), robots, surveillance cameras, medical micro-cameras, etc.

Image sensors may be broadly classified into a Charge Coupled Device (CCD) image sensor and a Complementary Metal Oxide Semiconductor (CMOS) image sensor. The CCD image sensor may be superior to the CMOS image sensor in terms of noise and image quality. However, the CMOS image sensor may be driven more easily than the CCD image sensor, and may be implemented using many more scanning schemes than those of the CCD image sensor. In addition, the CMOS image sensor may allow a signal processing circuit to be integrated into a single chip, such that the CMOS image sensor can be easily fabricated as a small-sized product, has very lower power consumption, and is compatible with CMOS fabrication technology, resulting in reduction in production costs. In recent times, the CMOS image sensor has been designed to be more compatible with mobile devices, such that CMOS image sensing devices have been intensively researched and rapidly come into widespread use.

SUMMARY

Various embodiments of the disclosed technology are directed to providing a method for processing an image signal, an image signal processor, and an image sensor chip for performing a shaking correction. Some implementations of the disclosed technology performs the shaking correction on a Bayer pattern image using a gyro sensor.

In accordance with an embodiment of the disclosed technology, a method for processing an image signal may include generating Bayer order status information indicating whether a Bayer order of a Bayer pattern image has been changed, based on translation information of gyro information, performing translation correction about the Bayer pattern image using the translation information, and performing interpolation about the Bayer pattern image in which the translation correction has been performed, based on the Bayer order status information.

In accordance with another embodiment of the disclosed technology, an image signal processor may include a Bayer order calculator configured to generate Bayer order status information indicating whether a Bayer order of a Bayer pattern image has been changed, based on translation information of gyro information, an electronic image stabilization (EIS) calculator configured to perform translation correction about the Bayer pattern image using the translation information, and an interpolation circuit configured to perform interpolation about the Bayer pattern image in which the translation correction has been performed, based on the Bayer order status information.

In accordance with another embodiment of the disclosed technology, an image sensor chip may include an image generation block configured to generate a Bayer pattern image comprised of pixel data each indicating single color information, and an image signal processor configured to generate Bayer order status information indicating whether a Bayer order of a Bayer pattern image has been changed, based on translation information of gyro information, perform translation correction about the Bayer pattern image using the translation information, and perform interpolation about the Bayer pattern image in which the translation correction has been performed, based on the Bayer order status information.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The above and other features and advantages of the present disclosure will become readily apparent by reference to the following detailed description when considered in conjunction with the accompanying drawings wherein:

FIGS. 7A to 7C are conceptual diagrams illustrating the step S160 shown in FIG. 4.

DETAILED DESCRIPTION

Figure 1:
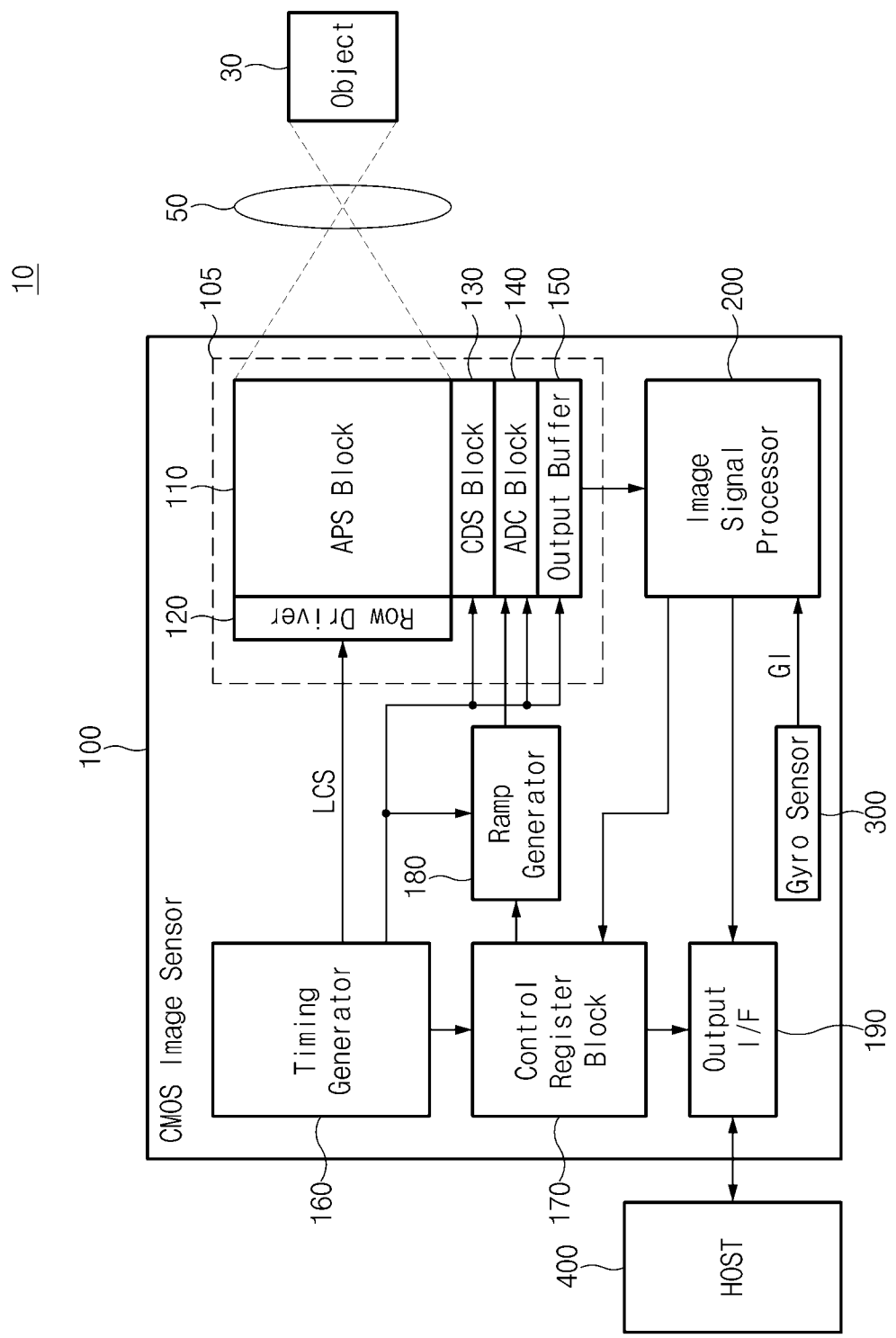
FIG. 1 is a block diagram illustrating an example of an image processing system based on some implementations of the disclosed technology.

Reference will now be made in detail to the embodiments of the present disclosure, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein, but on the contrary, the disclosure is intended to cover all modifications, equivalents, and alternatives. In the drawings, the sizes and shapes of elements may be exaggerated for convenience and clarity of description.

FIG. 1 is a block diagram illustrating an image processing system 10 based on some implementations of the disclosed technology.

Referring to FIG. 1, the image processing system 10 may be implemented as any of various electronic devices, for example, a digital camera, a mobile phone, a smartphone, a tablet personal computer (PC), a laptop, a personal digital assistant (PDA), an enterprise digital assistant (EDA), a digital still camera, a digital video camera, a portable multimedia player (PMP), a mobile Internet device (MID), a personal computer (PC), a wearable device, other cameras having various purposes (e.g., a front-view camera, a rear-view camera, a black box, etc. of a vehicle), etc.

The image processing system 10 may include an optical lens 50, a CMOS image sensor 100, and a host 400. In this case, the CMOS image sensor 100 may be implemented as a chip and, as such, the CMOS image sensor 100 will hereinafter be referred to as an image sensor chip.

The CMOS image sensor 100 may generate image data about an object 30 received (or captured) through the optical lens 50, and may transmit image data to the host 400. The optical lens 50 may include at least one lens configured to form an optical system.

The CMOS image sensor 100 may include an active pixel sensor (APS) block 110, a row driver 120, a Correlated Double Sampling (CDS) block 130, an Analog-to-Digital Converter (ADC) block 140, an output buffer 150, a timing generator 160, a control register block 170, a ramp generator 180, an output interface (I/F), 190, an image signal processor 200, and a gyro sensor 300. In this case, the above-mentioned constituent elements of the CMOS image sensor 100 are merely examples, at least some constituent elements from among the constituent elements may be added or omitted as necessary. In some implementations, a plurality of constituent elements may be integrated into a single structure, or the single structure may be divided into the plurality of constituent elements.

Each of the active pixel sensor (APS) block 110, the row driver 120, the CDS block 130, the ADC block 140, and the output buffer 150 can generate and output pixel data corresponding to each pixel and, as such, the APS block 110, the row driver 120, the CDS block 130, the ADC block 140, and the output buffer 150 will hereinafter be referred to as an image generation block 105.

The APS block 110 may include a plurality of pixels composed of a plurality of rows and a plurality of columns. Each of the pixels contained in the APS block 110 may store generated photocharges in response to incident light, and may generate a pixel signal corresponding to the stored photocharges. Each of the pixels may include a photoelectric conversion element to convert incident light into an electrical signal, and at least one transistor to process the electrical signal. For example, the photoelectric conversion element may include a photodiode (PD), a phototransistor, a photogate, a pinned photodiode, etc. Each pixel may be driven in response to a pixel control signal output from the row driver 120, and the electrical signal detected by each pixel may be transmitted to the CDS block 130 through a plurality of column lines (not shown). Types of pixel control signals may be changed according to structures of respective pixels (e.g., 3T, 4T, 5T, etc.). For example, in the case of using the 4T pixel, the pixel control signal may include a reset control signal RG, a transmission (Tx) control signal TG, and a selection control signal SEL.

A color filter array may be disposed between the APS block 110 and the optical lens 50, and may include a plurality of color filters configured to allow only specific wavelengths (e.g., red, blue, and green) incident upon the respective pixels to pass therethrough. Due to the color filter array, pixel data of each pixel may denote a value corresponding to light intensity of a specific wavelength, and each pixel may be referred to as a red pixel (R), a blue pixel (B), or a green pixel (G) according to types of the color filters. Although it is assumed that the red pixel (R), the blue pixel (B), and the green pixel (G) are arranged in a Bayer pattern for convenience of description, other implementations are also possible.

The row driver 120 may transmit a plurality of pixel control signals for controlling the respective pixels to the APS block 110 based on a line control signal LCS received from the timing generator 160. In more detail, the row driver 120 may generate the selection control signal SEL to select any one of the plurality of rows of the APS block 110. The row driver 120 may transmit the reset control signal RS and the transmission control signal TG to pixels corresponding to the selected row. As a result, an analog-type reference signal (or a reset signal) and an image signal that are generated from the pixels of the selected row may be transmitted to the CDS block 130. In this case, the reference signal and the image signal that are output from the pixels will hereinafter be generically called a pixel signal.

The CDS block 130 may sequentially sample and hold a set of the reference signal and the image signal that are transferred from the APS block 110 to each of the column lines. The CDS block 130 may sample and hold levels of the reference signal and the image signal that correspond to each column.

The ADC block 140 may receive a correlated double sampling (CDS) signal for each column from the CDS block 130, may convert the received CDS signal into a digital signal, and may thus output pixel data based on the digital signal. For this purpose, the ADC block 140 may include a comparator and a counter that correspond to each of the columns.

The output buffer 150 may receive pixel data for each column from the ADC block 140, may latch the received pixel data, and may output the latched pixel data. The output buffer 150 may temporarily store pixel data that is output from the ADC block 140, and may sequentially output pixel data in response to a control signal received from the timing generator 160.

The timing generator 160 may transmit a timing signal, a reference signal, and a control signal that are needed to generate and output image data to the constituent elements of the CMOS image sensor 100 in response to a control signal received from the control register block 170. In more detail, the timing generator 160 may output the line control signal LCS to the row driver 120 in a manner that pixel signals can be output in parallel from the pixels corresponding to the selected row line from among the plurality of row lines. The timing generator 160 may control the CDS block 130, the ADC block 140, and the output buffer 150 in a manner that pixel data corresponding to the selected column line from among the plurality of column lines can be sequentially output. The timing generator 160 may control the ramp generator 180 in a manner that the ADC block 140 can generate a ramp signal needed to perform analog-to-digital conversion (ADC).

The control register block 170 may control the timing generator 160, the ramp generator 180, and the output interface (I/F) 190 in response to a control signal received from the image signal processor 200.

The ramp generator 180 may generate a ramp signal in response to a control signal of the timing generator 160, and may transmit the generated ramp signal to the ADC block 140.

The output interface 190 may transmit image data received from the image signal processor 200 to the host 400.

The image signal processor 200 may perform signal processing to improve image quality of pixel data received from the output buffer 150, and may transmit the processed image data to the output interface 190. In this case, the signal processing may include electronic image stabilization (EIS), interpolation, hue correction, image quality correction, size adjustment, etc.

The image signal processor 200 may receive gyro information GI from the gyro sensor 300, and may perform EIS processing using the received gyro information GI.

The image signal processor 200 may control the control register block 170 in a manner that pixel data corresponding to a pixel selected from the APS block 110 can be transmitted to the image signal processor 200.

Although the image signal processor 200 shown in FIG. 1 is contained in the CMOS image sensor 100 and is then implemented as a single chip for convenience of description, the scope or spirit of the present disclosure is not limited thereto, and the image signal processor 200 may also be implemented as an independent chip different from the CMOS image sensor 100. In this case, the chip of the CMOS image sensor 100 and the chip of the image signal processor 200 may be implemented as a single package (e.g., a multi-chip package).

The gyro sensor 300 may generate gyro information GI about three-dimensional (3D) movement of the image processing system 10. For this purpose, the gyro sensor 300 may include an accelerator sensor and/or an angular velocity sensor. In addition, the gyro sensor 300 may include a motion filter (e.g., a low pass filter LPF) configured to remove noise contained in the output information of the accelerator sensor and/or the angular velocity sensor, such that the gyro sensor 300 may filter out or remove noise in the gyro information GI.

Although the gyro sensor 300 of FIG. 1 is contained in the CMOS image sensor 100 for convenience of description, the scope or spirit of the present disclosure is not limited thereto, and the gyro sensor 300 may also be implemented independently from the CMOS image sensor 100 as necessary. If the gyro sensor 300 is contained in the CMOS image sensor 100, gyro information GI may be generated based on movement of the CMOS image sensor 100, such that EIS processing can be more accurately carried out. In addition, the gyro sensor 300 may be implemented as a plurality of sensors, and the respective sensors of the gyro sensor 300 may be located inside and/or outside the CMOS image sensor 100. For real-time processing of data, the gyro information GI may be synchronized with a Bayer pattern image generated by the image generation block 105.

In response to a request or interrupt signal from another part, the host 400 may process image data generated by the CMOS image sensor 100, may store the processed image data, may display the stored image data, and may transmit the stored image data to an external part. For example, although the host 400 may be a Central Processing Unit (CPU), a display, or an application processor (AP), the scope or spirit of the present disclosure is not limited thereto.

Figure 2:
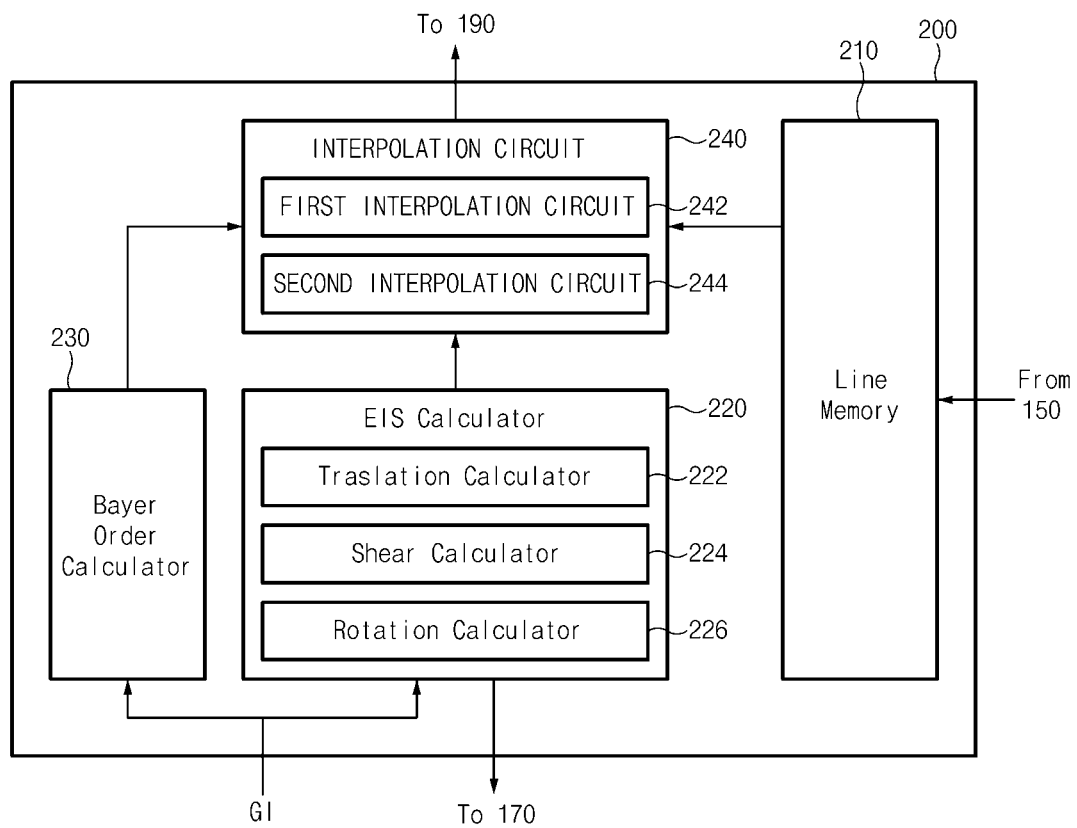
FIG. 2 is a block diagram illustrating an example of an image signal processor shown in FIG. 1.

FIG. 2 is a block diagram illustrating the image signal processor 200 shown in FIG. 1.

Referring to FIG. 2, the image signal processor 200 may include a line memory 210, an EIS calculator 220, a Bayer order calculator 230, and an interpolation circuit 240. The above-mentioned constituent elements of the image signal processor 200 shown in FIG. 2 are merely examples, and at least some constituent elements from among the constituent elements of the image signal processor 200 may be added to or omitted from the image signal processor 200 as necessary. The plurality of constituent elements may be integrated into one structure, or one structure may be divided into the plurality of constituent elements as necessary. In addition, the constituent elements of the image signal processor 200 may be implemented as software, hardware, or a combination thereof.

The line memory 210 may store pixel data received from the output buffer 150. In this case, pixel data of individual pixels may be mapped to pixel coordinates of each pixel, and the mapped result may be stored. Therefore, the interpolation circuit 240 may recognize which one of pixel coordinates includes the pixel data. In this case, the pixel coordinates may denote the position of each pixel in XY-planes of the APS block 110. For example, the pixel coordinates may denote the position of each pixel in the XY-plane. For example, provided that the APS block 110 includes 2304 columns and 1296 rows, the pixel coordinates of a first pixel arranged in an X-axis direction and a first pixel arranged in a Y-axis direction may be denoted by (0, 0), and the pixel coordinates of a pixel that is located not only at the 2304-th position of the X-axis direction, but also at the 1206-th position of the Y-axis direction may be denoted by (2303, 1295).

The line memory 210 may not simultaneously store pixel data corresponding to the entirety of only one frame as necessary. For example, provided that pixel data corresponding to only one frame is pixel data corresponding to 1120 rows, the line memory 210 may have storage capacity capable of storing pixel data corresponding to a maximum of 18 rows, but not limited thereto. The line memory 210 may not simultaneously store pixel data corresponding to the entirety of only one frame as necessary, and may have storage capacity suitable for processing of the image signal processor 200.

The line memory 210 may sequentially store pixel data therein. If a storage space to be used for storing new pixel data is considered insufficient, the line memory 210 may sequentially delete plural pixel data in the order of old pixel data new pixel data, such that the line memory 210 may store new pixel data. The pixel data stored in the line memory 210 will hereinafter be referred to as raw data or a Bayer pattern image. The Bayer pattern image means the pixel data generated from the APS block 110 in which pixels are arranged according to the Bayer pattern. The interpolation processed image, that is generated by the interpolation circuit 240 based on pixel data stored in the line memory 210, will hereinafter be referred to as an RGB image. In other words, data of each pixel of the Bayer pattern image may include only one color information, and data of each pixel of the RGB image may include RGB color information.

The EIS calculator 220 may sequentially calculate correction pixel coordinates for EIS correction based on pixel coordinates and gyro information GI. In this case, EIS correction may include at least one of translation correction, shear correction, and rotation correction.

The EIS calculator 220 may include a translation calculator 222 for translation correction, a shear calculator 224 for shear correction, and a rotation calculator 226 for rotation correction.

The translation calculator 222 may calculate translation information (i.e., X-axis movement information and Y-axis movement information) of the gyro information GI and pixel coordinates, such that the translation calculator 222 may calculate first correction pixel coordinates using the calculation result information. The translation calculator 222 may generate a horizontal synchronization signal HSYNC and a vertical synchronization signal VSYNC using the first correction pixel coordinates, and may transmit the horizontal synchronization signal HSYNC and the vertical synchronization signal VSYNC to the control register block 170. In accordance with another embodiment, the translation calculator 222 may generate base information (e.g., reference pixel coordinates to decide a waveform of each of the horizontal synchronization signal HSYNC and the vertical synchronization signal VSYNC) to be used as a basis for generating the horizontal synchronization signal HSYNC and the vertical synchronization signal VSYNC, and may transmit the generated base information to the control register block 170. Therefore, the timing generator 160 or the control register block 170 may also generate the horizontal synchronization signal HSYNC and the vertical synchronization signal VSYNC as necessary.

The horizontal synchronization signal HSYNC and the vertical synchronization signal VSYNC may be used to decide the ranges of pixels corresponding to pixel data that is transmitted from the output buffer 150 to the image signal processor 200. For example, provided that each of the horizontal synchronization signal HSYNC and the vertical synchronization signal VSYNC has a first level (e.g., a high level) and a second level (e.g., a low level), only a pixel, which corresponds to a section in which the horizontal synchronization signal HSYNC is at a first level, from among a plurality of pixels contained in one row may output a pixel signal through a column line. In addition, only pixel data of a row, which corresponds to a section in which the vertical synchronization signal VSYNC is at a first level, from among a plurality of rows may be transmitted to the image signal processor 200.

The shear calculator 224 may calculate segment movement information of the gyro information GI and the first correction pixel coordinates, and may thus calculate second correction pixel coordinates based on the calculated result.

The rotation calculator 226 may calculate rotation information of the gyro information GI and the second correction pixel coordinates, and may thus calculate third correction pixel coordinates.

The EIS calculator 220 may transmit not only third correction pixel coordinates but also non-correction pixel coordinates corresponding to the third correction pixel coordinates to the interpolation circuit 240. Detailed operations of the EIS calculator 220 will be described later with reference to FIG. 4.

Based on translation information (X-axis movement information and Y-axis movement information) of the gyro information GI, the Bayer order calculator 230 may generate Bayer order status information indicating whether a Bayer order of the Bayer pattern image has been changed due to operations of the translation calculator 222.

Pixel data stored in the line memory 210 may have color information about any one of R, G, and B which is obtained from the corresponding color filter. The pixel data may be output to the line memory 210 in a predetermined order based on RGB combination, and the predetermined order for outputting the pixel data will hereinafter be referred to as a Bayer order.

The Bayer order may be used for deciding which color is represented by the respective pixel data of the Bayer pattern image. Thus, the Bayer order can be considered a key information used in an interpolation operation (e.g., a Bayer-to-RGB demosaic process) to be carried out by the interpolation circuit 240.

However, the Bayer order may be changed during the above-mentioned operation by the translation calculator 222, and the Bayer order status information is used to indicate whether the Bayer order has been changed. Detailed operations of the Bayer order calculator 230 will hereinafter be described with reference to FIGS. 6A to 6D.

The interpolation circuit 240 may generate an RGB image as the result of the interpolation of the Bayer pattern image. The generated RGB image may correspond to coordinates of each pixel. The interpolation circuit may use the third correction pixel coordinates and the Bayer order status information to generate the RGB image. In some implementations, the interpolation circuit 240 may include a first interpolation circuit 242 and a second interpolation circuit 244.

The first interpolation circuit 242 may decide a color as any one of R, G, and B corresponding to integer coordinates of the third correction pixel coordinates using Bayer order status information, and may generate RGB data corresponding to each integer coordinate. In this case, the first interpolation circuit 242 may read pixel data corresponding to integer coordinates of the third correction pixel coordinates from the line memory 210 based on the mapping information between the non-correction pixel coordinates and the integer coordinates of the third correction pixel coordinates, may determine a color (any one of R, G, and B) corresponding to integer coordinates of the third correction pixel coordinates using the Bayer order status information, and may generate RGB data of the corresponding coordinates through 3×3 mask interpolation centered on any one of the coordinates. Thus, when the interpolation is performed four times using 4 different 3×3 masks within a 4×4 mask comprised of 4 rows and 4 columns, RGB data about a central unit Bayer pattern may be obtained.

The second interpolation circuit 244 may generate RGB data corresponding to coordinates of each pixel of the final window using RGB data corresponding to integer coordinates of the third correction pixel coordinates and also using decimal coordinates of the third correction pixel coordinates. In this case, the final window may denote a set of pixels contained in one frame that is output from the image signal processor 200. In this case, the second interpolation circuit 244 may apply a weight based on decimal coordinates of the third correction pixel coordinates using a 2×2 mask of RGB data about the acquired Bayer pattern, and may thus generate RGB data corresponding to individual integer coordinates of the third correction pixel coordinates. The second interpolation circuit 244 may output RGB data corresponding to individual integer coordinates of the third correction pixel coordinates contained in the final window to the output interface 190.

Figure 3:
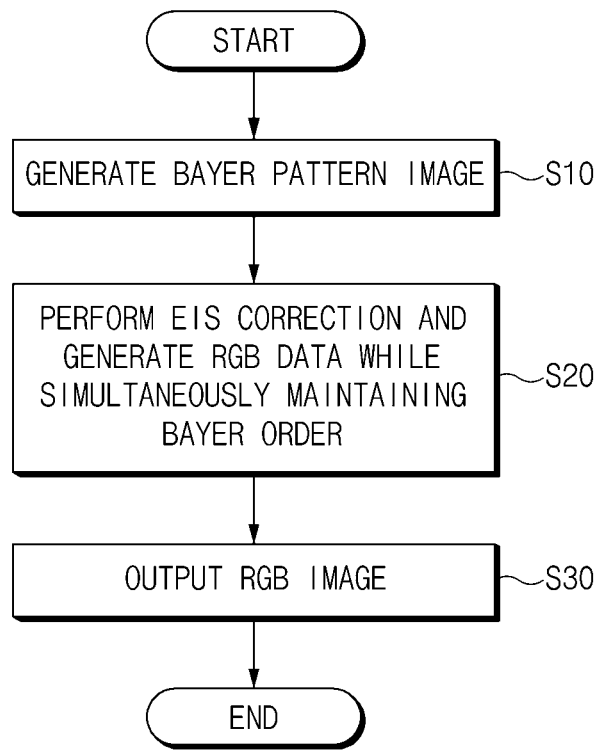
FIG. 3 is a flowchart illustrating an example of an image signal processing method based on some implementations of the disclosed technology.

FIG. 3 is a flowchart illustrating an image signal processing method based on some implementations of the disclosed technology.

Referring to FIG. 3, at step S10, the image generation block 105 of the CMOS image sensor 100 may generate pixel data (i.e., Bayer pattern image) of the respective pixels arranged in a Bayer pattern in response to a control signal received from the timing generator 160.

At step S20, the image signal processor 200 may perform EIS using gyro information GI of the gyro sensor 300, and may perform the interpolation of the Bayer pattern image using the Bayer order status information indicating whether the Bayer order has been changed or not. The image signal processor 200 may generate RGB data while keeping the Bayer order obtained prior to the EIS correction.

At step S30, the image signal processor 200 may output the RGB data about the final window.

Figure 4:
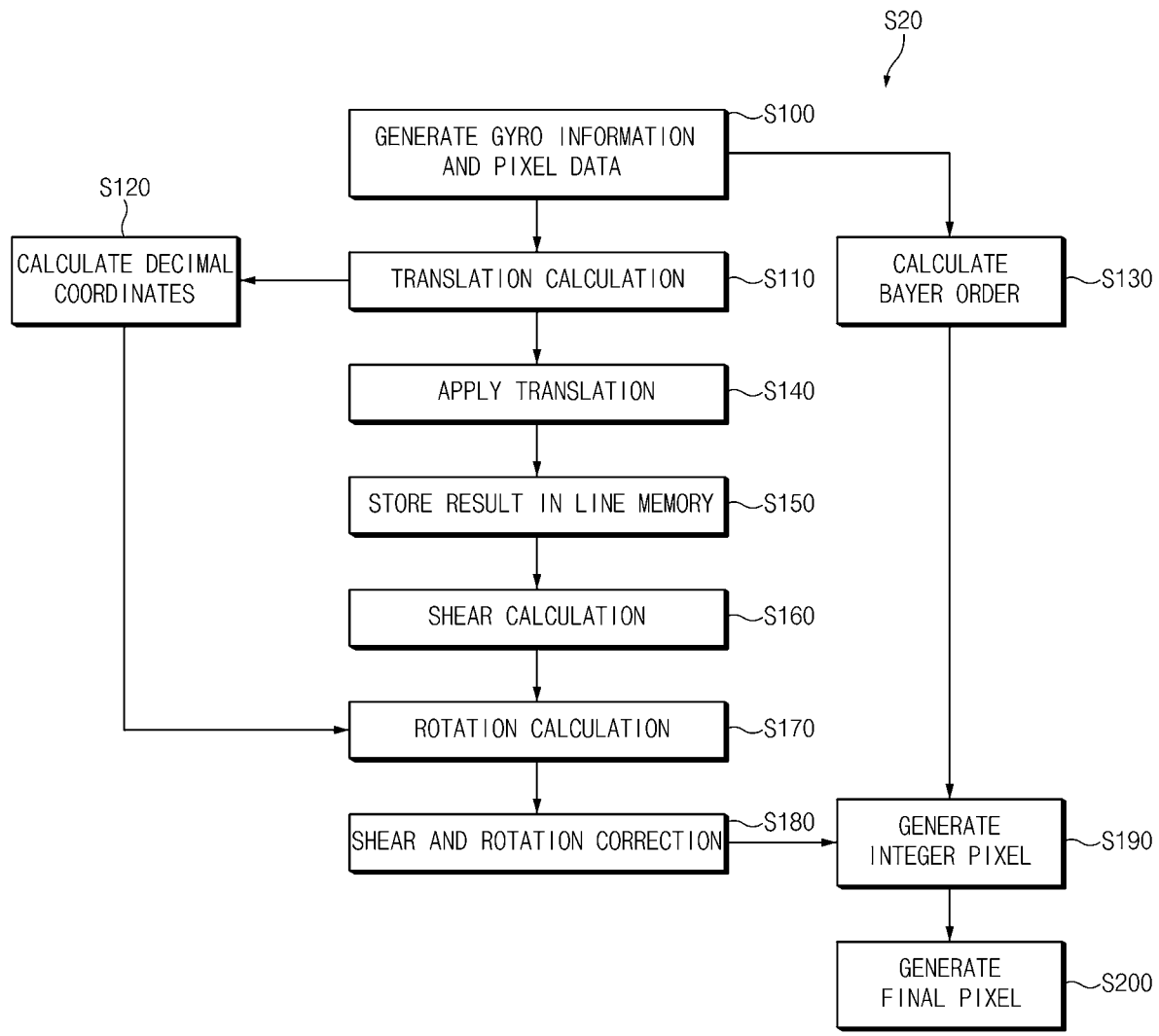
FIG. 4 is a flowchart illustrating an example of an image signal processing method S20 shown in FIG. 3.
Figure 5:
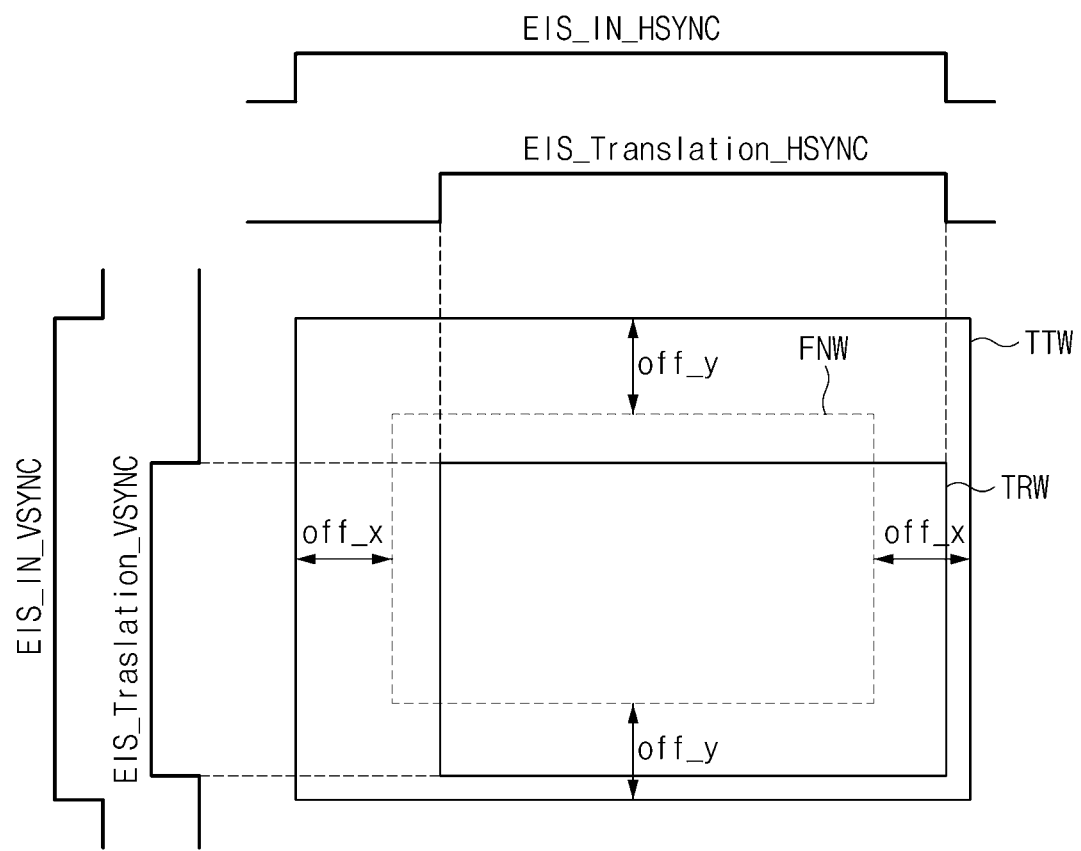
FIG. 5 is a conceptual diagram illustrating an example of two steps S110 and S140 shown in FIG. 4.
Figure 8:
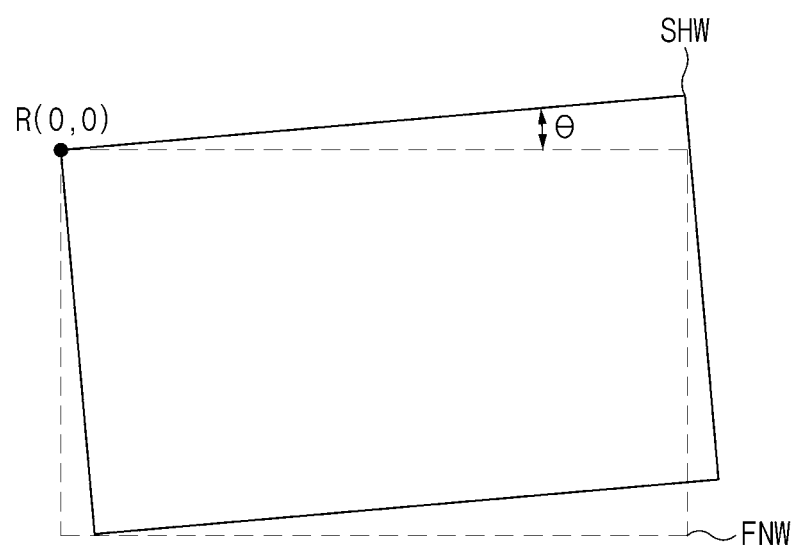
FIG. 8 is a conceptual diagram illustrating the step S170 shown in FIG. 4.
Figure 9:
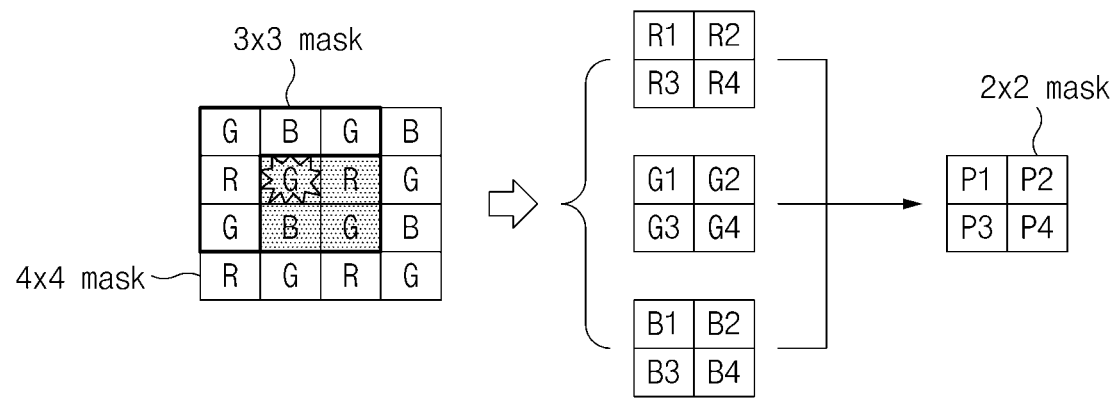
FIG. 9 is a conceptual diagram illustrating two steps S190 and S200 shown in FIG. 4.

FIG. 4 is a flowchart illustrating an image signal processing method S20 shown in FIG. 3. FIG. 5 is a conceptual diagram illustrating steps S110 and S140 shown in FIG. 4. FIGS. 6A to 6D are conceptual diagrams illustrating the step S130 shown in FIG. 4. FIGS. 7A to 7C are conceptual diagrams illustrating the step S160 shown in FIG. 4. FIG. 8 is a conceptual diagram illustrating the step S170 shown in FIG. 4. FIG. 9 is a conceptual diagram illustrating steps S190 and S200 shown in FIG. 4.

Referring to FIG. 4, when the CMOS image sensor 100 starts the image capturing in response to a request or interrupt signal received from the host 400, at step S100, the image generation block 105 may generate pixel data and the gyro sensor 300 may generate gyro information GI.

The translation calculator 222 may calculate translation information of the gyro information GI and pixel coordinates, and may thus calculate first correction pixel coordinates. The translation information may include X-axis movement information (mv_x) and Y-axis movement information (mv_y). The X-axis movement information (mv_x) may indicate how much (e.g., in a unit of pixel) the gyro sensor 300 has shaken (or has moved) in the X-axis direction. The Y-axis movement information (mv_y) may indicate how much (e.g., in a unit of pixel) the gyro sensor 300 has shaken (or has moved) in the Y-axis direction. In this case, each of the X-axis movement information (mv_x) and the Y-axis movement information (mv_y) may include not only an integer but also a decimal. For example, if the X-axis movement information (mv_x) is set to +2.5, this means that the gyro sensor 300 has shaken (or has moved) by a predetermined distance corresponding to "+2.5 pixels" in the X-axis direction. If the Y-axis movement information (mv_y) is set to −3.5, this means that the gyro sensor 300 has shaken (or has moved) by a predetermined distance corresponding to "−3.5 pixels" in the Y-axis direction.

Referring to FIG. 5, the translation calculator 222 may correct coordinates of each pixel (X, Y) using the translation correction equation, such that the translation calculator 222 may calculate first correction pixel coordinates (X', Y'). The translation correction equation may be represented by the following equation 1.

$$X'=X+mv\_x$$

$$Y'=Y-mv\_y \quad \text{[Equation 1]}$$

Thus, the translation calculator 222 may calculate X-axis coordinates (X') of the first correction pixel coordinates by adding the X-axis movement information (mv_x) of the X-axis coordinates of the pixel coordinates, and may calculate Y-axis coordinates (Y') of the first correction pixel coordinates by subtracting Y-axis movement information (mv_y) from the Y-axis coordinates of the pixel coordinates. In this case, the reason why the X-axis movement information (mv_x) and the Y-axis movement information (mv_y) have opposite signs in Equation 1 is that a sign of the coordinate system of the gyro sensor 300 is different from a sign of the coordinate system of the pixel coordinates. In more detail, whereas the coordinate value of the coordinate system of the gyro sensor 300 may be gradually reduced in a downward direction, the coordinate value of the coordinate system of the pixel coordinates may be gradually increased in a downward direction.

Referring back to FIG. 4, the translation calculator 222 may separate integer coordinates (int(X'), int(Y')) and decimal coordinates (X_dp', Y_dp') of the first correction pixel coordinates (X', Y') from each other. Thus, the translation calculator 222 may extract integer coordinates (int(X'), int(Y')) of the first correction pixel coordinates (X', Y'), and may subtract the integer coordinates (int(X'), int(Y')) of the first correction pixel coordinates (X', Y') from the first correction pixel coordinates (X', Y'), such that the translation calculator 222 may calculate decimal coordinates (X_dp', Y_dp') of the first correction pixel coordinates (X', Y') in step S120. For example, when the first correction pixel coordinates (X', Y') are denoted by (200.4, 360.7), the integer coordinates of the first correction pixel coordinates (X', Y') may be denoted by (200, 360), and the decimal coordinates of the first correction pixel coordinates (X', Y') may be denoted by (0.4, 0.7).

In subsequent steps S140, S150, and S160, the integer coordinates of the first correction pixel coordinates (X', Y') may be used, and the decimal coordinates of the first correction pixel coordinates (X', Y') may be used in step S170.

In the meantime, based on the X-axis movement information and the Y-axis movement information, the Bayer order calculator 230 may generate Bayer order status information indicating whether the Bayer order has been changed due to operations of the translation calculator 222 in step S130.

Various types in which the Bayer order has been changed due to operations of the translation calculator 222 are shown in FIGS. 6A to 6D. The Bayer pattern may be classified into a first-type Bayer pattern (hereinafter referred to as 'GB_first type') in which GB from among RGB is firstly arranged, a second-type Bayer pattern (hereinafter referred to as 'BG_first type') in which BG from among RGB is firstly arranged, a third-type Bayer pattern (hereinafter referred to as 'RG_first type') in which RG from among RGB is firstly arranged, and a fourth-type Bayer pattern (hereinafter referred to as 'GR_first type') in which GR from among RGB is firstly arranged.

FIGS. 6A to 6D show examples of cases where the Bayer order has been changed. FIGS. 6A to 6D illustrate shaking images in which image shaking occurs and stabilized images in which the shaking is corrected. Referring to FIGS. 6A to 6D, the GB-first typed shaking images are changed to the 'GB_first type' Bayer pattern in FIG. 6A, the 'BG_first type' Bayer pattern in FIG. 6B, the 'RG_first type' Bayer pattern in FIG. 6C, and the 'GR_first type' Bayer pattern in FIG. 6D.

The Bayer pattern including RGB may be repeated for every two pixels in each of the X-axis direction and the Y-axis direction. As a result, whereas the Bayer order is unchanged when a translation distance is denoted by an even number, the Bayer order is changed when a translation distance is denoted by an odd number.

Thus, the Bayer order calculator 230 may generate Bayer order status information using an integer part of the X-axis movement information (mv_x) indicating X-directional shaking and an integer part of the Y-axis movement information (mv_y) indicating Y-axis directional shaking.

Figures 6A, 6B, 6C, 6D:
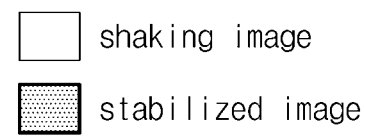
FIGS. 6A to 6D are conceptual diagram illustrating the step S130 shown in FIG. 4.

For example, when the integer part of each of the X-axis movement information (mv_x) and the Y-axis movement information (mv_y) is denoted by an even number, there is no change in the 'GB_first type' Bayer order (as shown in the example of FIG. 6A). When the integer part of the X-axis movement information (mv_x) is denoted by an odd number and the integer part of the Y-axis movement information (mv_y) is denoted by an even number, the Bayer order is changed from the 'GB_first type' Bayer order to the 'BG_first type' Bayer order (as shown in the example of FIG. 6B). When the integer part of the X-axis movement information (mv_x) is denoted by an even number and the integer part of the Y-axis movement information (mv_y) is denoted by an odd number, the Bayer order is changed from the 'GB_first type' Bayer order to the 'RG_first type' Bayer order (as shown in the example of FIG. 6C). When the integer part of the X-axis movement information (mv_x) is denoted by an odd number and the integer part of the Y-axis movement information (mv_y) is denoted by an odd number, the Bayer order is changed from the 'GB_first type' Bayer order to the 'GR_first type' Bayer order (as shown in the example of FIG. 6D).

For example, the Bayer order status information may be composed of 2 bits. In this case, the Bayer order may have two bits '00' in the example of FIG. 6A, '01' in the example of FIG. 6B, '10' in the example of FIG. 6C, and '11' in the example of FIG. 6D.

As described above, the Bayer order may be changed due to operations of the translation calculator 222. The Bayer pattern image stored in the line memory 210 may have color information of any one of R, G, and B per pixel, differently from the RGB image. Thus, it is impossible to generate a normal RGB image without reflecting the changed Bayer order in the interpolation operation. Therefore, some implementations of the disclosed technology allow the Bayer order status information generated by the Bayer order calculator 230 to be reflected in the interpolation operation in a subsequent step S190.

Referring back to FIG. 4, the translation correction is performed at step S140. Thus, the translation calculator 222 may generate the horizontal synchronization signal HSYNC and the vertical synchronization signal VSYNC using integer coordinates of the first correction pixel coordinates, and may transmit the horizontal synchronization signal HSYNC and the vertical synchronization signal VSYNC to the control register block 170.

Referring to FIG. 5, assuming that the horizontal synchronization signal HSYNC is at a first level (EIS_IN_HSYNC) within the entire section and the vertical synchronization signal VSYNC is at a first level (EIS_IN_VSYNC) within the entire section, the image generation block 105 may generate pixel data about all pixels of the APS block 110, and may transmit the generated pixel data to the line memory 210. In this case, all the pixels may construct a total window TTW.

If shaking does not occur, it is assumed that the set of pixels corresponding to pixel data transmitted to the line memory 210 is a final window FNW. Differences between the total window TTW and the final window FNW may include a first offset (off_x) in X-axis direction (i.e., a horizontal direction) and a second offset (off_y) in Y-axis direction (i.e., a vertical direction). In a specific example, the first offset (off_x) may be 152 pixels and the second offset (off_y) may be 88 pixels but other implementations are also possible. In some implementations, the final window FNW may also denote the set of pixels output from the image signal processor 200.

If shaking occurs and the first correction pixel coordinates (X', Y') are calculated based on the pixel coordinates (X, Y), a horizontal synchronization signal (EIS_Translation_HSYNC) and a vertical synchronization signal (EIS_Translation_VSYNC) may be generated in a manner that pixel data corresponding to the pixel coordinates (X, Y) can be stored in the line memory 210 and that the integer coordinates of the first correction pixel coordinates (X', Y') are within in the final window FNW. Since pixel data corresponding to a translation window TRW decided by the horizontal synchronization signal (EIS_Translation_HSYNC) and the vertical synchronization signal (EIS_Translation_VSYNC) is stored in the line memory 210, it may be possible to apply translation to a target image in steps S140 and S150.

For shear correction in step S160 and rotation correction in step S170, the translation window TRW may be longer than the final window FNW by a first length in the X-axis direction, and may be longer than the final window FNW by a second length in the Y-axis direction. For example, the first length may include a margin (i.e., 16×2=32 pixels) for shear correction, and may include a margin (i.e., 10 pixels) for rotation correction. The second length may include a margin (i.e., 18 pixels) for rotation correction. In this case, the first length and the second length may be determined according to the scope of gyro information GI generated by the gyro sensor 300.

In accordance with an embodiment, each of the first length and the second length may further include a margin (e.g., 2 pixels) for interpolation.

Referring back to FIG. 4, the shear calculator 224 may calculate segment movement information of the gyro information GI and the integer coordinates (int(X'), int(Y')) of the first correction pixel coordinates, and may thus calculate the second correction pixel coordinates based on the calculation result in step S160.

Referring to FIGS. 7A to 7C, segment movement information of the gyro information GI may denote the degree of a slope caused by an occurrence of sudden movement in the X-axis direction, and may include information about a movement distance of each of a plurality of segments arranged in the Y-axis direction. For example, the translation window TRW may be divided into the plurality of segments SEG1 to SEGn (where 'n' is an integer equal to or higher than 2), and the movement distances X0 to Xn corresponding to borders of the respective segments may be included or contained in the segment movement information. For example, 'n' may be set to '8'.

The shear calculator 224 may calculate a slope (she_in) for each segment using the movement distances X0 to Xn corresponding to borders of the respective segments. For example, a slope (she_in) of a first segment SEG1 may be obtained by dividing a difference (X1-X0) in movement distance between an upper border and a lower border of the first segment SEG1 by the number (e.g., 140 lines) of Y-axis directional lines of the first segment SEG1. In addition, a slope (she_in) of a second segment SEG2 may be obtained by dividing a difference (X2-X1) in movement distance between an upper border and a lower border of the second segment SEG2 by the number (e.g., 140 lines) of Y-axis directional lines of the second segment SEG2.

The shear calculator 224 may multiply a slope (she_in) for each segment by a relative position value (she_cnt(y)) of the integer coordinates (int(X'), int(Y')) of the first correction pixel coordinates to obtain a product of the slope (she_in) and the integer coordinates (int(X'), int(Y')), and may perform calculation between the product and the integer coordinates (int(X')) of the first correction pixel coordinates, such that the shear calculator 224 may correct the slope of the integer coordinates (int(X'), int(Y')) of the first correction pixel coordinates (as shown in FIGS. 7A and 7B). In this case, a relative position value (she_cnt(y)) of the integer coordinates (int(X'), int(Y')) of the first correction pixel coordinates may denote a Y-axis directional relative of the integer coordinates (int(X'), int(Y')) of the first correction pixel coordinates within the corresponding segment. If it is assumed that the corresponding segment is composed of 140 lines, a relative position value (she_cnt(y)) of the integer coordinates (int(X'), int(Y')) of the first correction pixel coordinates belonging to a first line (i.e., the highest line) of the segment is denoted by zero '0', and the relative position value may sequentially increase one by one in a downward direction, such that a relative position value (she_cnt(y)) of the integer coordinates (int(X'), int(Y')) of the first correction pixel coordinates belonging to the last line (i.e., the lowest line) is denoted by '139'.

The shear calculator 224 may calculate a segment offset (she_ofs) for each segment based on the correction result obtained when the slope of the integer coordinates (int(X'), int(Y')) of the first correction pixel coordinates is corrected, and may arrange the plurality of segments SEG1 to SEGn to be aligned with any one (e.g., the first segment SEG1) of the plurality of segments SEG1~SEGn (as shown in FIGS. 7B and 7C). When the slope of the integer coordinates (int(X'), int(Y')) of the first correction pixel coordinates is corrected, such slope correction is carried out based on a movement distance of the upper border of each segment, such that the segment offset (she_ofs) may be used to perform arrangement on the basis of the movement distance X0 of the upper border of the first segment SEG1. For example, the segment offset (she_ofs) of the second segment SEG2 may be denoted by 'X1-X0', and the segment offset (she_ofs) of the third segment SEG3 may be denoted by 'X2-X0'.

The shear correction processes of FIGS. 7(*a*), 7(*b*), and 7(*c*) may be represented by the following shear correction equation 2.

$$\begin{bmatrix} SX \\ SY \\ 1 \end{bmatrix} = \begin{bmatrix} int(X') - she\_in * she\_cnt(y) - she\_ofs \\ int(Y') \\ 1 \end{bmatrix} \quad \text{[Equation 2]}$$

In Equation 2, the slope (she_in) and the segment offset (she_ofs) may be determined per segment, and the relative position value (she_cnt(y)) of the integer coordinates (int (X'), int(Y')) of the first correction pixel coordinates may be changed per line of the corresponding pixel. In addition, the shear correction process may be used to correct the X-axis directional slope, such that the Y-axis coordinates of the integer coordinates (int(X'), int(Y')) of the first correction pixel coordinates may remain unchanged. When shear correction has been completed upon the integer coordinates (int(X'), int(Y')) of the first correction pixel coordinates, second correction pixel coordinates (SX, SY) may be created.

Although FIGS. 7A to 7C have exemplarily disclosed the shear correction of an image tilted at a positive (+) slope for convenience of description, other implementations are also possible. Thus, embodiments of the disclosed technology may also be applied to shear correction of an image tilted at a negative (−) slope.

Referring back to FIG. 4, the rotation calculator 226 may calculate rotation information of the gyro information GI and the second correction pixel coordinates (SX, SY) to obtain the third correction pixel coordinates (RX, RY) in step S170. Rotation information of the gyro information GI may denote a tilted rotation angle caused by Z-axis directional movement perpendicular to each of the X-axis and the Y-axis.

Referring to FIG. 8, a window composed of the second correction pixel coordinates (SX, SY) that has been created after completion of shear correction may be defined as a shear window SHW, and rotation correction is applied to the second correction pixel coordinates (SX, SY) of the shear window SHW, resulting in formation of the final window FNW.

If a rotation angle based on rotation information contained in the gyro information GI is denoted by 'θ', the rotation correction equation may be represented by the following equation 3.

$$\begin{bmatrix} RX \\ RY \\ 1 \end{bmatrix} = \begin{bmatrix} \cos\theta & -\sin\theta & 0 \\ \sin\theta & \cos\theta & 0 \\ 0 & 0 & 1 \end{bmatrix} \begin{bmatrix} SX + X\_dp' \\ SY - Y\_dp' \\ 1 \end{bmatrix} \quad \text{[Equation 3]}$$

In this case, the rotation calculator 226 may calculate (e.g., addition or subtraction) the decimal coordinates (X_dp', Y_dp') of the first correction pixel coordinates (X',Y') and apply the calculated value to the second correction pixel coordinates (SX, SY). By reflecting decimal values of the X-axis movement information (mv_x) and the Y-axis movement information (mv_y) of the gyro information (GI) in the second correction pixel coordinates (SX, SY), more correct correction can be performed.

For more simplified calculation of the rotation correction equation, it is assumed that coordinates corresponding to the corner of a left upper end of the shear window SHW are set to an origin point R(0,0) of rotation correction. In this case, it may be possible to perform conversion of the second correction pixel coordinates (SX, SY), and the conversion result may be recovered after calculation based on the rotation correction equation has been completed.

Although FIG. 8 has exemplarily disclosed rotation correction about the image rotated by a positive (+) angle for convenience of description, other implementations are also possible. For example, the embodiments of the disclosed technology may also be applied to rotation correction about an image rotated by a negative (−) angle.

Referring back to FIG. 4, the rotation calculator 226 may transmit the calculated third correction pixel coordinates (RX, RY) and the mapping information between the third correction pixel coordinates (RX, RY) and non-correction pixel coordinates (X,Y) to the interpolation circuit 240, such that shear correction and rotation correction can be applied to the entire image in step S180. In this case, the mapping information between the third correction pixel coordinates (RX, RY) and the non-correction pixel coordinates (X, Y) may provide information about which pixel coordinates (X, Y) are associated with the third correction pixel coordinates (RX, RY) prior to execution of translation, shear, and rotation correction.

The first interpolation circuit 242 of the interpolation circuit 240 may decide one color (any one of R, G, and B) corresponding to the integer coordinates of the third correction pixel coordinates (RX, RY) using Bayer order status information, and may generate RGB data corresponding to individual integer coordinates (i.e., integer pixels) in step S190.

Referring to FIG. 9, it is assumed that the integer coordinates of the third correction pixel coordinates (RX, RY) of the shaded Bayer pattern correspond to the Bayer pattern located around the corner of the left upper end of the final window FNW.

The first interpolation circuit 242 may read pixel data corresponding to the integer coordinates of the third correction pixel coordinates (RX, RY) from the line memory 210, based on the mapping information between the integer coordinates of the third correction pixel coordinates (RX, RY) and the non-correction pixel coordinates (X, Y).

In addition, the first interpolation circuit 242 may decide one color (any one of R, G, and B) corresponding to the integer coordinates of the third correction pixel coordinates using the Bayer order status information. FIG. 9B illustrates Bayer order status information indicating that the Bayer pattern has been changed from 'GB_first type' to 'GR_first type'. In FIG. 9, colors of individual pixels in a 4×4 mask including the shaded Bayer pattern can be decided.

The first interpolation circuit 242 may generate RGB data of the corresponding pixel through interpolation based on a 3×3 mask including the respective color-decided pixels including the G pixel as shown with emphasis in FIG. 9 on the center of the 3×3 mask. In other words, if interpolation is performed four times using 4 different (3×3) masks based on different pixels within the 4×4 mask, it is possible to obtain RGB data of the unit Bayer pattern on the center.

Referring back to FIG. 4, the second interpolation circuit 244 may generate the RGB data corresponding to the integer coordinates of the third correction pixel coordinates (RX, RY) and RGB data corresponding to individual pixel coordinates (i.e., the final pixel) of the final window using the decimal coordinates of the third correction pixel coordinates (RX, RY) in step S200.

Referring to FIG. 9, the second interpolation circuit 244 may use a weight based on the decimal coordinates of the third correction pixel coordinates (RX, RY) using the 2×2 mask of RGB data of the acquired Bayer pattern, such that the second interpolation circuit 244 may generate final RGB data corresponding to the respective integer coordinates of the third correction pixel coordinates (RX, RY).

For example, if it is assumed that RGB data of the pixel P1 is denoted by 'R1/G1/B1' calculated by the first interpolation circuit 242, RGB data of the pixel P2 is denoted by 'R2/G2/B2' calculated by the first interpolation circuit 242, RGB data of the pixel P3 is denoted by 'R3/G3/B3' calculated by the first interpolation circuit 242, RGB data of the pixel P4 is denoted by 'R4/G4/B4' calculated by the first interpolation circuit 242, and the decimal coordinates of the pixel P1 are denoted by (0.3, 0.5), the second interpolation circuit 244 may allocate a weight corresponding to (0.3, 0.5) to each of R1, R2, R3, and R4 contained in the 2×2 mask, such that the second interpolation circuit 244 may calculate final R data based on the allocation result. Likewise, the second interpolation circuit 244 may allocate a weight corresponding to (0.3,0.5) to each of G1, G2, G3, and G4 and each of B1, B2, B3, and B4 contained in the 2×2 mask, such that the second interpolation circuit 244 may calculate final G data and final B data based on the allocation results.

The second interpolation circuit 244 may output final RGB data corresponding to the respective integer coordinates of the third correction pixel coordinates contained in the final window FNW to the output interface 190.

As described above, as the first calculation of the Bayer order status information, the second calculation of the respective correction coordinates based on the pixel coordinates, and the interpolation based on the first and second calculation can be processed in real time, the embodiments of the disclosed technology can perform EIS correction and interpolation processing using the line memory 210 only without the necessity to store the entirety of images corresponding to the entire frame.

The image signal processing method according to the embodiments of the disclosed technology can perform EIS correction based on gyro information on the Bayer pattern image instead of the RGB image, and can generate an RGB image of the corrected Bayer pattern image based on the Bayer order changed in the EIS correction process, such that the EIS correction function in which a minimum of system resources is consumed can be implemented.

In some implementations, the image signal processing method according to the embodiments of the disclosed technology can perform EIS using the line memory only instead of the frame memory without storing pixel data unnecessary for EIS correction, such that system resources requisite for EIS correction can be greatly consumed.

In addition, the image signal processing method according to the embodiments of the disclosed technology can perform EIS correction including translation correction, shear correction, and rotation correction in an integrated manner using gyro information within the image sensor chip.

It is understood that various embodiments and terminology used herein are not intended to limit technical ideas described in this document to specific embodiments, but rather to include various modifications, equivalents, and/or alternatives of the embodiments. Wherever possible, the same reference numbers will be used throughout the drawings to refer to the same or like portions. As used in the specification and appended claims, the terms "a", "an", "one", "the" and other similar terms include both singular and plural forms, unless context clearly dictates otherwise. A singular representation may include a plural representation unless otherwise stated in context. In the present application, an expression such as "A or B", "at least one of A and B", "at least one of A or B", "A, B or C", "at least one of A, B and C", or "at least one of A, B, or C" may include all possible combinations of one or more items selected from among listed related items. An expression such as "first" and "second" used in the present application may indicate corresponding constituent elements regardless of order and/or importance, is used to distinguish a constituent element from another constituent element, and does not limit corresponding constituent elements. When it is described that a constituent element (e.g., a first constituent element) is "(functionally or communicatively) coupled to" or is "connected to" another constituent element (e.g., a second constituent element), it should be understood that the constituent element may be directly (e.g., by wire) connected to the other constituent element, may be wirelessly connected to the other constituent element, or may be connected to the other constituent element through another constituent element (e.g., a third constituent element).

The term "module" as used in the present application includes a unit configured with hardware, software, or firmware and may be interchangeably used with a term such as a logic, logic block, component, or circuit. The term "module" may be an integrally configured component or a minimum unit or a portion thereof that performs at least one function. The term "module" may be implemented mechanically or electronically and may include, for example, an application-specific integrated circuit (ASIC).

Various embodiments of the disclosed technology may be implemented as software (e.g., program) including one or more instructions stored in a storage medium (e.g., on-board memory or external memory) readable by a machine (e.g., electronic device). For example, a processor (e.g., processor) of the machine (e.g., the electronic device) may retrieve at least one instruction from among the instructions stored in the storage medium, and may execute the retrieved instruction, such that the machine can operate to perform at least one function in response to the at least one retrieved instruction. The one or more instructions may include code generated by a compiler or code capable of being executed by an interpreter. The machine-readable storage medium may be implemented as a non-transitory storage medium. In this case, the term "non-transitory storage medium" may indicate that the storage medium is a tangible device and does not include signals (e.g., electromagnetic waves), and the term "non-transitory" does not discriminate between one case in which data is permanently stored in the storage medium and the other case in which data is temporarily stored in the storage medium.

In accordance with various embodiments, methods according to various embodiments disclosed in the present application may be contained in a computer program product, and may then be provided to users. The computer program products may be traded between sellers and buyers as goods. The computer program product may be implemented as a machine-readable storage medium (e.g., a compact disc read only memory CD-ROM) and then rapidly distributed to users. Alternatively, the computer program product may be directly distributed to two user devices (e.g., smartphones), may be distributed to two user devices (e.g., smartphones) through an application store (e.g., PlayStore™), or may be distributed online to two user devices (e.g., smartphones) (e.g., downloaded or uploaded). In online distribution, at least a portion of the computer program product may be temporarily or provisionally stored in a machine-readable storage medium, for example, a server of a manufacturing company, a server of an application store, or a memory of a relay server.

In accordance with various embodiments, each (e.g., a module or program) of the above-mentioned constituent elements may include one or more entities. In accordance with various embodiments, at least one constituent element from among the above-mentioned constituent elements or at least one operation may be omitted, or one or more other constituent elements or one or more other operations may be added. Alternatively or additionally, the plurality of constituent elements (e.g., modules or programs) may be integrated into only one constituent element. In this case, the integrated constituent element may perform one or more functions of each of the plurality of constituent elements in the same way as or in a similar way to the previous operation that has been executed by the corresponding constituent element from among the plurality of constituent elements prior to execution of such integration. According to various embodiments, operations performed by a module, a program, or another constituent element may be sequentially, parallelly, repeatedly, or heuristically executed, at least one of the above operations may be executed in different order or omitted, or another operation may be added.

As is apparent from the above description, the image signal processing method, the image signal processor, and the image sensor chip according to the embodiments of the disclosed technology can perform Electronic Image Stabilization (EIS) correction based on gyro information about a Bayer pattern image but not an RGB image, may form an RGB image about the corrected Bayer pattern image using a Bayer order changed in the EIS correction, and may thus implement an EIS correction function having minimum consumption of system resources.

In some implementations, the embodiments of the disclosed technology can perform EIS only using a line memory instead of a frame memory, such that system resources needed for EIS correction can be greatly reduced.

The embodiments of the disclosed technology can allow EIS correction including translation correction, shear correction, and rotation correction to be carried out in an integrated manner using gyro information for use in the image sensor chip.

The embodiments of the disclosed technology can provide a variety of effects capable of being directly or indirectly recognized through the above-mentioned patent document.

Those skilled in the art will appreciate that the disclosed technology may be carried out in other specific ways than those set forth herein. The above embodiments are therefore to be construed in all aspects as illustrative and not restrictive.

Although a number of illustrative embodiments consistent with the present disclosure have been described, it should be understood that numerous other modifications and embodiments can be made. For example, numerous variations and modifications are possible in the component parts and/or arrangements. In addition to variations and modifications in the component parts and/or arrangements, alternative uses will also be apparent to those skilled in the art.

What is claimed is:

1. A method for processing an image signal comprising:
monitoring a shaking movement of an image sensing device;
generating Bayer order status information indicating whether a Bayer order of a Bayer pattern image has been changed due to the shaking movement of the image sensing device, based on translation information indicating the shaking movement, the Bayer pattern image corresponding to pixel data each having color information that is one of red, green, or blue color and the Bayer order indicating a sequence of the color information of the Bayer pattern image; and
performing translation correction about the Bayer pattern image using the translation information; and
performing an interpolation on the Bayer pattern image on which the translation correction has been performed, based on the Bayer order status information, and
wherein the performing the translation correction includes:
obtaining first correction pixel coordinates by calculating pixel coordinates of the Bayer pattern image and the translation information; and
generating a horizontal synchronization signal and a vertical synchronization signal based on the first correction pixel coordinates, and
wherein the obtaining the first correction pixel coordinates includes:
calculating X-axis coordinates of the first correction pixel coordinates by adding X-axis movement information of the translation information to X-axis coordinates of the pixel coordinates; and
calculating Y-axis coordinates of the first correction pixel coordinates by subtracting Y-axis movement information of the translation information from Y-axis coordinates of the pixel coordinates.

2. The method according to claim 1, wherein the generating the horizontal synchronization signal and the vertical synchronization signal includes:

generating the horizontal synchronization signal and the vertical synchronization signal in a manner that a Bayer pattern image corresponding to pixel coordinates are stored in a line memory and that integer coordinates of the first correction pixel coordinates are within in a final window.

3. The method according to claim 2, wherein a translation window decided by the horizontal synchronization signal and the vertical synchronization signal is longer than the final window by a first length in an X-axis direction, and is longer than the final window by a second length in a Y-axis direction.

4. The method according to claim 3, wherein the first length and the second length are determined based on the gyro information.

5. The method according to claim 1, further comprising:
after performing the translation correction, performing shear correction using segment movement information of gyro information to obtain second correction pixel coordinates.

6. The method according to claim 5, wherein:
the segment movement information includes a movement distance for each of the plurality of segments, and
the performing the shear correction includes:
correcting a slope of each segment calculated using the movement distance of each segment; and
calculating the second correction pixel coordinates by arranging the plurality of segments using a segment offset calculated using the movement distance of each segment.

7. The method according to claim 1, further comprising:
after performing the translation correction, performing rotation correction using rotation information of gyro information to obtain third correction pixel coordinates.

8. The method according to claim 7, further comprising:
performing shear correction using segment movement information of the gyro information to obtain second correction pixel coordinates, and wherein the performing the rotation correction includes:
adding or subtracting decimal coordinates of the first correction pixel coordinates to or from the second correction pixel coordinates.

9. The method according to claim 7, wherein the performing the interpolation includes:
reading pixel data corresponding to integer coordinates of the third correction pixel coordinates;
determining a color corresponding to the integer coordinates of the third correction pixel coordinates using the Bayer order status information; and
generating RGB data using a mask including pixels whose colors have been decided.

10. The method according to claim 9, wherein the performing the interpolation further includes:
generating final RGB data using the RGB data and decimal coordinates of the third correction pixel coordinates.

11. The method according to claim 1, wherein the Bayer pattern image is stored in a line memory.

12. The method according to claim 1, wherein the generating the Bayer order status information includes:
generating the Bayer order status information according to whether an integer part of each of X-axis movement information and Y-axis movement information of the translation information is an even number or an odd number.

13. An image signal processor comprising:
a Bayer order calculator configured to generate Bayer order status information indicating whether a Bayer order of a Bayer pattern image has been changed due to shaking of an image sensing device including the image signal processor, based on translation information of gyro information indicating a movement of the image sensing device caused by the shaking;
an electronic image stabilization (EIS) calculator configured to perform translation correction about the Bayer pattern image using the translation information; and an interpolation circuit configured to perform an interpolation on the Bayer pattern image on which the translation correction has been performed, based on the Bayer order status information, and
wherein the Bayer order calculator is configured to generate the Bayer order status information based on whether an integer part of each of X-axis movement information and Y-axis movement information of the translation information is an even number or an odd number.

14. The image signal processor according to claim 13, wherein:
the electronic image stabilization (EIS) calculator calculates first correction pixel coordinates by calculating pixel coordinates of the Bayer pattern image and the translation information, and generates a horizontal synchronization signal and a vertical synchronization signal based on the first correction pixel coordinates.

15. The image signal processor according to claim 13, wherein the electronic image stabilization (EIS) calculator performs shear correction using segment movement information of gyro information, and performs rotation correction using rotation information of the gyro information to obtain third correction pixel coordinates.

16. The image signal processor according to claim 15, wherein:
the interpolation circuit reads pixel data corresponding to integer coordinates of the third correction pixel coordinates, determines a color corresponding to the integer coordinates of the third correction pixel coordinates using the Bayer order status information, and generates RGB data using a mask including pixels whose colors have been decided.

17. An image sensor device comprising:
an image generator configured to generate a Bayer pattern image including pixel data each indicating single color information;
a gyro sensor configured to monitor a movement of the image sensor device due to a shaking of the image sensor device;
an image signal processor configured to generate Bayer order status information indicating whether a Bayer order of the Bayer pattern image has been changed due to the shaking of the image sensor device, perform translation correction on the Bayer pattern image using translation information indicating the monitored movement of the image sensor device from the gyro sensor, and perform interpolation on the Bayer pattern image in which the translation correction has been performed, based on the Bayer order status information, and
wherein the image signal processor is configured to generate the Bayer order status information based on whether an integer part of each of X-axis movement information and Y-axis movement information of the translation information is an even number or an odd number.

* * * * *